United States Patent [19]

Carrell et al.

[11] Patent Number: 4,617,731

[45] Date of Patent: Oct. 21, 1986

[54] INSULATION DISPLACEMENT TERMINAL WIRE INSERTION TOOL AND METHOD

[75] Inventors: Ross M. Carrell, Cinnaminson, N.J.; George J. Whitley, Philadelphia, Pa.

[73] Assignee: RCA Corporation, Princeton, N.J.

[21] Appl. No.: 779,100

[22] Filed: Sep. 23, 1985

[51] Int. Cl.[4] ........................ H01R 43/04; B23P 19/02

[52] U.S. Cl. ........................................ 29/861; 29/748; 29/33 F

[58] Field of Search .............. 29/33 M, 748, 865, 866, 29/861, 33 F; 414/222, 226

[56] References Cited

U.S. PATENT DOCUMENTS

| | | | |
|---|---|---|---|
| 3,460,238 | 8/1969 | Christy et al. | 29/481 |
| 3,734,386 | 5/1973 | Hazel | 228/5 |
| 3,866,294 | 2/1975 | McCaughey . | |
| 4,118,103 | 10/1978 | Leidy et al. | 339/98 |
| 4,216,580 | 8/1980 | Chisholm | 29/842 |
| 4,271,573 | 6/1981 | von Roesgen | 29/33 |
| 4,272,879 | 6/1981 | Wigby et al. | 29/566.2 |
| 4,387,509 | 6/1983 | Dechelette | 29/850 |
| 4,399,842 | 8/1983 | Gibbons | 140/92.1 |
| 4,414,740 | 11/1983 | Nijman | 29/751 |
| 4,437,603 | 3/1984 | Kobayashi et al. | 228/4.5 |
| 4,461,061 | 7/1984 | Rock | 29/33 |

FOREIGN PATENT DOCUMENTS 705713 12/1979 U.S.S.R. .

OTHER PUBLICATIONS

Operator's Manual for Thermosonic Ball Bonding Machine, Section 3, 1412/1413 Operation, Kulicke Soffa, Horsham, PA.

Standard Products Catalog/3, Third Edition, Catalog 2005-8, issued Aug. 1983, by AMP, Inc., pp. 46, 89-93, 228, 231, 280-285, 397, 440, and 479.

AMP Pneumatic Insertion Tool 58069-1, Instruction Sheet IS 6799, released Jul. 13, 1983 by AMP Inc., pp. 1-4.

"Availability, Operation, and Size Ranges for Automatic Discrete Wire Harness Mass Termination I.D. Connector Systems," Reprinted from Insulation/Circuits, Jun. 1979, pp. 1-5.

*Primary Examiner*—Howard N. Goldberg
*Assistant Examiner*—Carl J. Arbes
*Attorney, Agent, or Firm*—Joseph S. Tripoli; William Squire

[57] ABSTRACT

A wire insertion tool includes a pair of fingers which are selectively cammed to different states. One finger supports the terminal as the wire is inserted into the terminal by the other finger avoiding reaction forces on the substrate to which the terminal is attached. The fingers have a state in which they keep the wire aligned with the insertion portion of the fingers as the fingers travel from terminal to terminal in a wiring cycle. The fingers have a wire sever state to sever the wire at the end of the wiring cycle in which a length of wire is attached to a plurality of terminals. A feed assembly feeds wire to the fingers as the wire is played out during the wiring cycle to minimize tensioning the wire as the tool travels.

20 Claims, 10 Drawing Figures

INSULATION DISPLACEMENT TERMINAL WIRE INSERTION TOOL AND METHOD

This invention relates to tools for attaching a length of wire to an insulation displacement terminal.

Of interest are the following copending applications: Ser. No. 779,099, filed concurrently herewith, entitled "Pneumatic Insulation Displacement Terminal Wire Insertion Tool", by Brian G. Keeler et al.; Ser. No. 751,900, filed July 5, 1985, entitled "Wire Insertion Apparatus for Insulation Displacement Terminal," by John G. Aceti et al.; and Ser. No. 738,394, filed May 28, 1985, entitled "Terminal and Method of Using Same," by Ross M. Carrell, all of which are assigned to the assignee of the present invention.

Terminals for receiving insulated wires directly which do not require that the insulation first be removed and which automatically cut into the insulation and deform the wire to make a reliable electrical connection, are in wide use and are known as insulation displacement terminals (IDTs). Such a terminal includes at least one bifurcated element forming a pair of spaced tines. The spacing between the tines is smaller than the diameter of the conductor of the insulated wire to be connected to the terminal. When an insulated conductor is pushed into the space between the tines, the insulation is cut by the tines so that each tine makes electrical contact with the conductor. The insertion of the wire scrapes away any contamination on the surfaces of the conductor and the tines, deforming the conductor and bringing fresh metal surfaces of the conductor and the tines together in compression.

One example of the use of such terminals is illustrated in U.S. Pat. No. 4,387,509. A particular terminal which might be useful in the above-mentioned patent is disclosed in U.S. Pat. No. 4,118,103. Another IDT which would be useful in the embodiment of the aforementioned U.S. Pat. No. 4,387,509 is a terminal known as "Quadra-mate" manufactured by AMP, Inc., shown in their Standard Products Catalog/3, Third Edition, Catalog 2005-8, issued August 1983, page 479. There are automatic apparatuses for pushing wires onto IDTs such as shown in U.S. Pat. Nos. 4,461,061 and 4,271,573 and in copending application Ser. No. 751,900, mentioned above.

As disclosed in application Ser. No. 738,394 mentioned above, a problem with IDTs as presently commercially employed and illustrated by way of example in the aforementioned patents, is that the corresponding insertion tool usually applies a force of relatively large magnitude, for example, about 20 lbs. with 24 AWG wire to push the wire into the IDT slot. In a case where the substrate to which the IDT is secured is a thin member such as a printed circuit board and so forth, support is required for the substrate to withstand that insertion force. Additionally, when a large number of IDTs or components are employed on a substrate, the substrate tends to have a large number of apertures. These apertures tend to weaken the substrate so as to make support of the substrate during insertion of the wire into the IDTs extremely important. Without such support, the substrate may tend to fracture or otherwise undesirably deform, precluding proper insertion of a wire into the IDT.

While the above arrangement may be acceptable for insertion of wires into substrates which can be placed in fixtures and jigs designed to support the IDTs at the insertion point, the problem becomes more acute when the substrate is relatively unsupported at the IDTs such as might occur, for example, in circuit control terminals which may be part of an electronic assembly such as a television receiver and not readily adaptable for such fixtures and jigs.

Aforementioned application Ser. No. 738,394 discloses a terminal which deals with the above-noted problem with present commercially available IDTs. This terminal is illustrated in FIG. 7 herein. In this terminal the wire is pushed onto the tines in a direction parallel to the substrate supporting the IDT and permits the relatively high insertion force to be applied in pliar-like fashion to avoid applying a direct force on the substrate during the insertion. Disclosed in that application are a pair of insertion jaws for squeezing the wire onto the IDT. However, the present inventors recognize that it is important to attach wires to such terminals automatically as by a robot. This is not easily done, as automatically positioned pliar-like tools could crush the terminal. This crushing is attributed to slight variation in position of the terminals on the substrate as compared to the ideal design position. Even small variations in terminal position within 0.010 inch tend to cause terminal crushing with a robotically operated tool. Also, wiring a terminal automatically may result in tension on the wire between the terminal and the tool after the wire is attached to the terminal. Such tension might bend the terminal.

A wire insertion tool according to the present invention comprises a support adapted to be attached to an automatic insertion tool head which locates and moves the tool relative to an IDT on a substrate. The tool includes a first element movably secured to the support having an open state and a terminal support state. The element has a groove therein adapted for receiving and mating with a tine support structure of an IDT terminal in a terminal support state. The groove and the terminal support structure are dimensioned such that the receiving of the terminal support structure in the groove tends to align the tines of the terminal relative to the groove.

A second element movably secured to the support has an open state and a wire insertion state. The second element includes a wire insertion member adapted to mate with the terminal tines for pushing a wire into electrical engagement with the aligned tines in the insertion state. Wire feed means are secured to the support for feeding the wire between and aligned with the groove and the insertion member.

Actuating means are coupled to the support and to the elements for causing the first element to move from its open state to its support state to seat and align the tine support structure in the groove and thereby align the tines relative to the second element. The actuating means causes the second element to push the wire toward the first element into engagement with the tines in the insertion state. The first element supports the tines at the tine support structure during the wire pushing with negligible reaction forces on the head and on the substrate.

Figure 1:
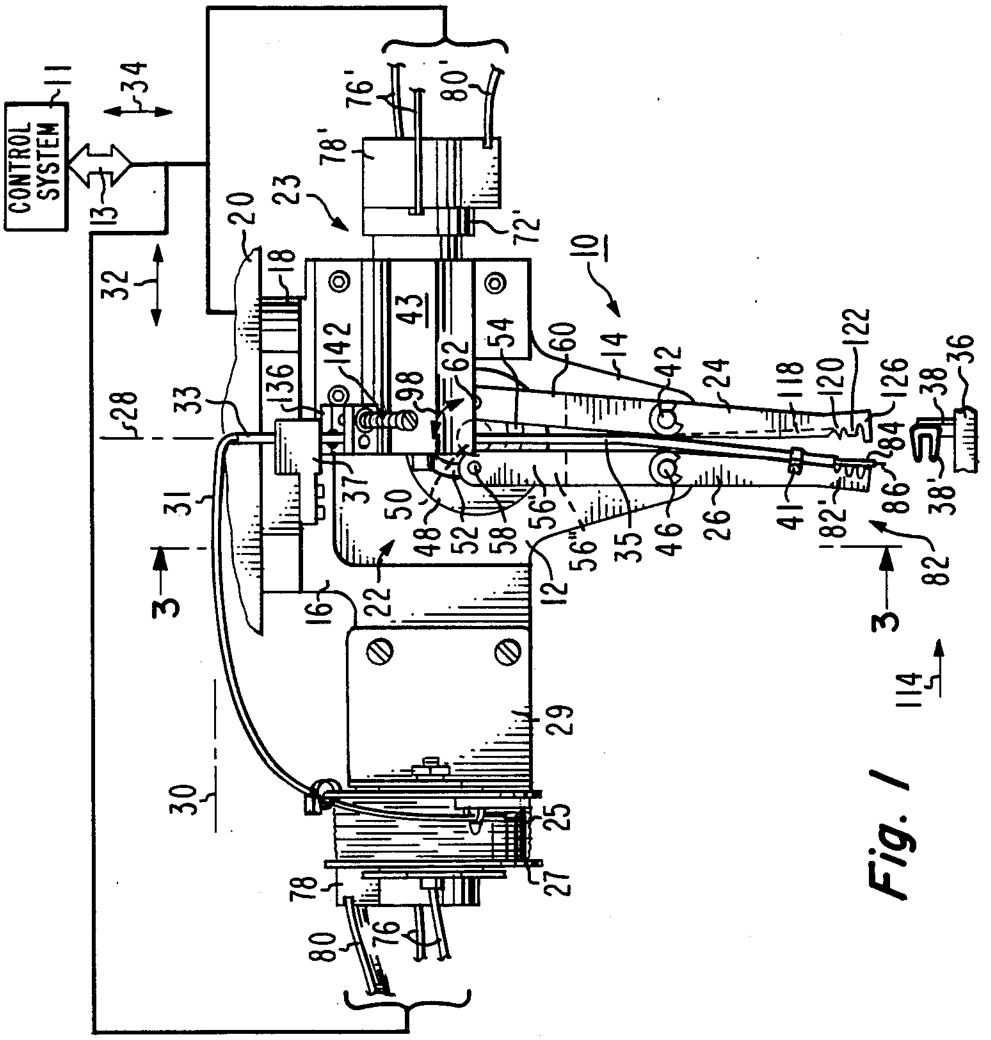
FIG. 1 is a front elevation view, partially schematic, of a tool in accordance with one embodiment of the present invention.

In FIG. 1, tool 10 comprises a support 12 which may be formed of aluminum, having a body 16 from which leg 14 depends. Secured to body 16 is disk-like head 18 adapted to be releasably secured to a robotic arm 20 of a robotic system (not shown). Pivotally attached to leg 14 at pins 42 and 46 are respective IDT wire insertion fingers 24 and 26. An actuating assembly 22 is secured to body 16 for operating the fingers. A feed mechanism 23 is secured to body 16 via housing 43 to feed wire 25 from spool 27 attached to body 16 via bracket 29. In the alternative, spool 27 may be at a location remote from tool 10.

Figure 3:
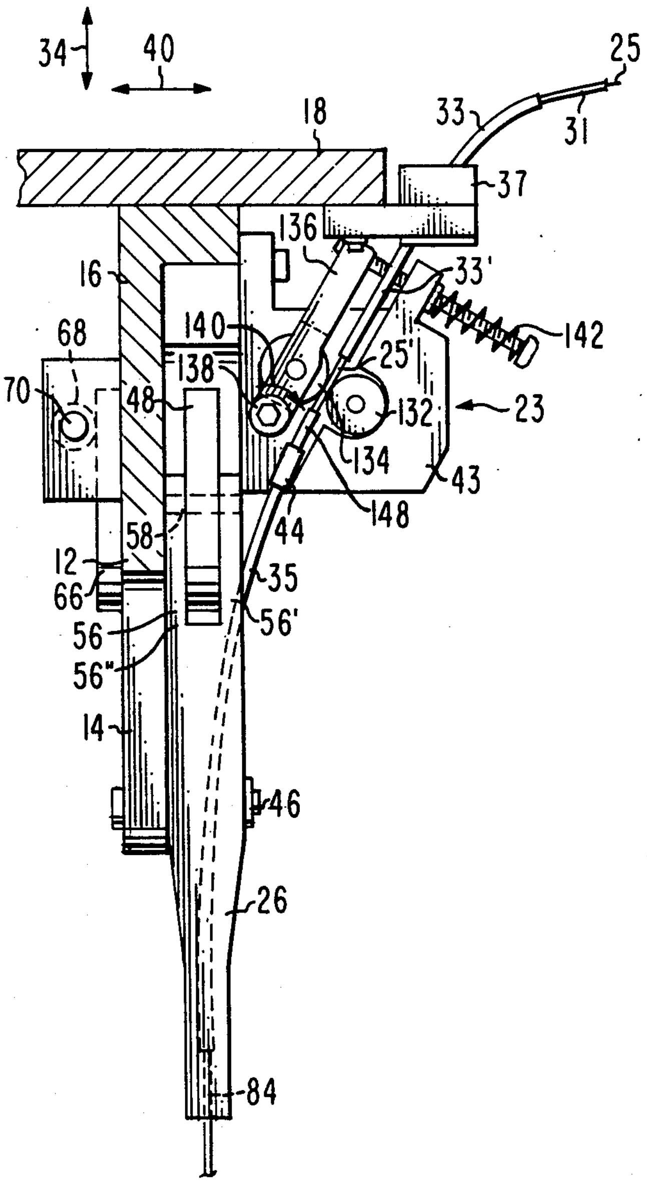
FIG. 3 is a sectional side elevation view of the apparatus of FIG. 1 taken along lines 3—3 illustrating the wire feed mechanism portion of the tool.

In FIG. 3, wire 25 is fed by feed mechanism 23 through plastic guide tube 31 and then through aligned metal tubes 33 and 35. Tube 33 is secured to head 18 by bracket 37. Tube 35 is secured at its lower end to finger 26 by bracket 41 (FIG. 1). The other upper end of tube 35 is attached to housing 43 by T bracket 44. Tube 35 is sufficiently flexible to bend somewhat, if necessary, between brackets 41 and 44 as finger 26 pivots. Tubes 33 and 35 are aligned where they terminate adjacent wire feed mechanism 23.

The robotic arm 20, FIG. 1, includes linkages and motors for displacing support 12 to any desired coordinate position in response to signals from a programmed control system 11 via cable 13. System 11 can cause arm 20 to rotate, for example, about an axis 28, a second axis 30 normal to axis 28 and displace in three orthogonal directions such as directions 32 and directions 34; as well as directions 40 (FIG. 3) perpendicular to the plane of FIG. 1. The robotic system thus can place the fingers 24 and 26 in any desired coordinate position relative to substrate 36 and can accommodate substrates in any desired position. These computer controlled displacements align the fingers 24 and 26 with any selected IDT on the substrate, such as IDT 38.

While only one IDT 38 is illustrated in FIG. 1, in practice, at least two or more IDTs may be secured to the substrate to which a single wire may be attached by the tool 10. Further, there may be a greater number of IDTs on the substrate 36 or on other substrates. The tool 10 can sequentially attach a length of wire to a number of the IDTs, sever the length wire attached to those terminals from the wire in tube 35 and then attach a second length of wire to another set of IDTs. The wiring is completed in any sequence to the IDTs regardless their plane and orientation relative to the tool 10. Such programmable robotic control systems included in system 11 are commercially available and, therefore, need not be described further herein. A computer program is written for a particular implementation, programming the coordinates and desired motions into the system.

Figure 8:
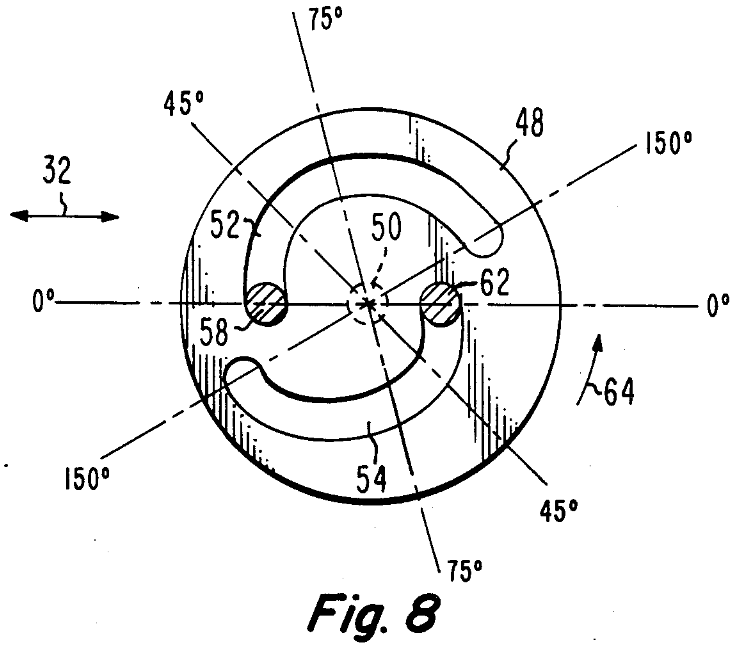
FIG. 8 is a front elevation view showing, in more detail, an operating cam for controlling the position of the fingers of the tool of FIG. 1.

In FIG. 1, actuating assembly 22 includes a cam 48 rotatably secured to body 16 by cam drive shaft 50. Cam 48 includes a pair of uniform width spiral-like slots 52 and 54 which converge toward shaft 50 as shown in more detail in FIG. 8. In FIG. 8, slots 52 and 54 converge in accordance with the desired finger actions.

In FIG. 3, finger 26 at upper end 56 adjacent cam 48 has spaced legs 56′ and 56″. Cam 48 is closely nested between these legs. Pin 58, secured to legs 56′ and 56″, passes through cam slot 52, FIG. 1. Pin 58 has nearly the same diameter as the transverse width of slot 52 so as to follow the path of slot 52 as cam 48 rotates about the axis of drive shaft 50 with negligible play therebetween. In FIG. 1, finger 24 is constructed similar as finger 26 at upper end 60 adjacent cam 48. Finger 24, end 60 is attached to cam slot 54 by pin 62 in a manner similar to the attachment of finger 26 to cam slot 52.

Figure 9:
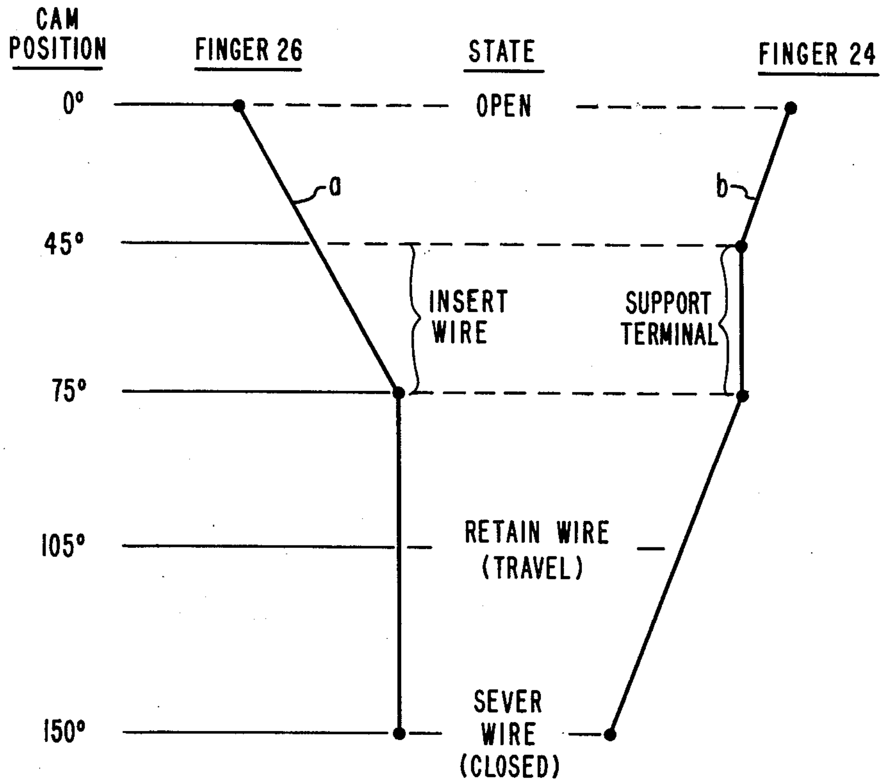
FIG. 9 is a diagram schematically illustrating the relative significance of the cam tracks of the cam of FIG. 8 in the operation of the tool of FIG. 1.

In FIG. 8, as cam 48 is rotated in direction 64 by drive shaft 50, the pins 58 and 62 spread apart in directions 32. In the position illustrated in FIG. 8, pins 58 and 62 are closest together in a reference 0° position of cam 48. Cam 48 is rotated in direction 64 a maximum of 150°. The opposite ends of fingers 24 and 26 thus have maximum separation or the wide open state in the 0° position as shown in FIG. 9 by the relative spacing between curves a and b, respectively, at the 0° line. As cam 48 is rotated in direction 64, it passes the 45° position, the 75° position, and the 105° position. This action closes the fingers as shown by the relative positions of curves a and b. Each of these positions define a different state of the fingers, as will be described more fully below.

Figure 2:
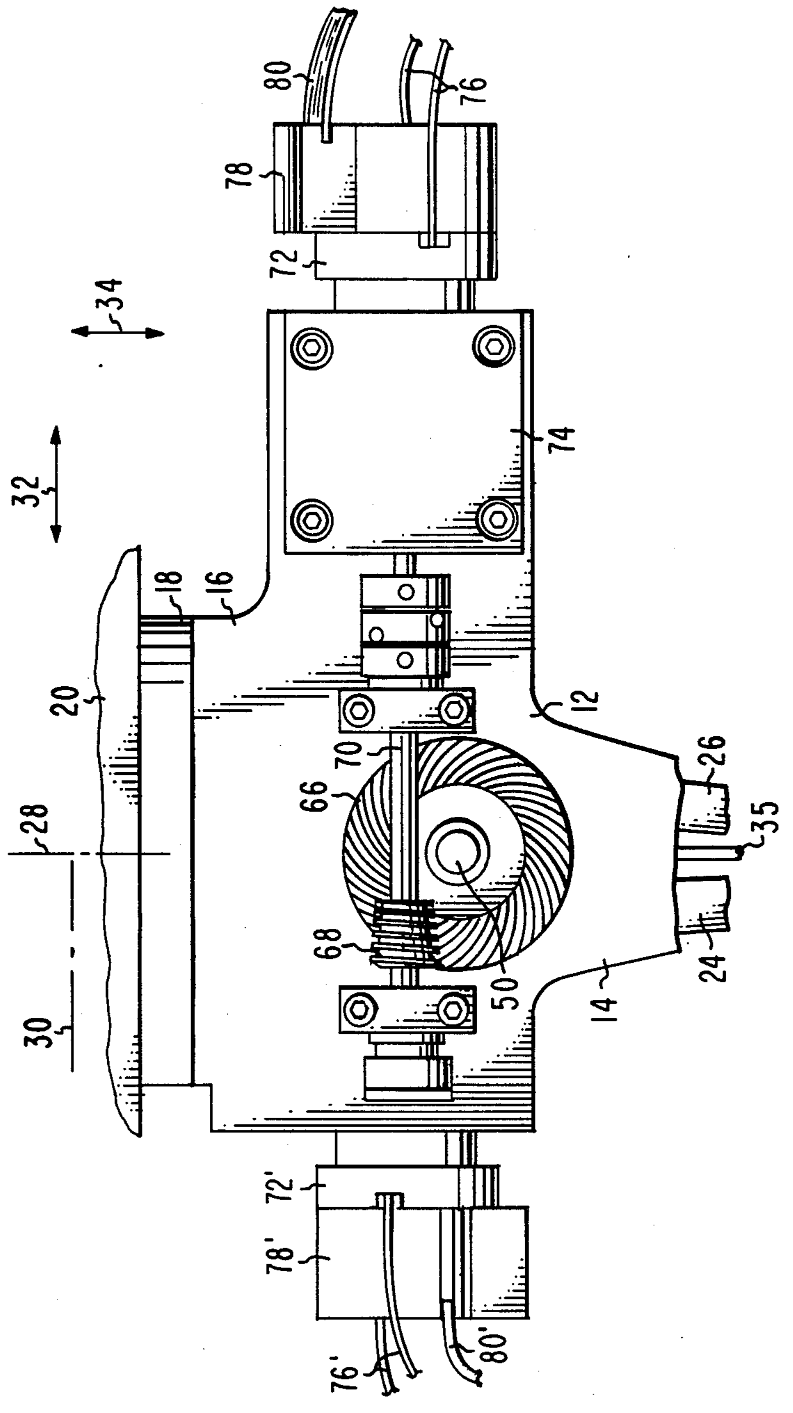
FIG. 2 is a rear elevation view of a portion of the tool of FIG. 1 illustrating the finger drive gears.

In FIG. 2, drive shaft 50 is connected to a spiroidal gear 66. Gear 66 is driven by spiral gear 68 attached to shaft 70. Shaft 70 is driven by servo motor 72 attached to support 12 via bearing block 74. Motor 72 is driven by electrical signals supplied on wires 76 coupled to a power source (not shown) via control system 11 (FIG. 1). An optoelectric shaft position encoder 78 is coupled to motor 72 for accurately determining the angular position of shaft 70 and thus gear 66 and cam 48. Encoder 78 sends and receives signals via cable 80 to and from control system 11 which decodes the motor 72 shaft position. System 11 includes a power source (not shown) and preprogrammed information to drive motor 72 to its desired position. The encoder 78, motor 72, and arrangement of gears 66 and 68 are such that the motor 72 can rotate gear 66 0.0045 degrees for each incremental count of the encoder 78, the encoder 78 being one which has 500 counts per revolution and has a two-phase quadrature output. A commercially available controller can position the shaft of motor 72 with a resoluton of 2,000 counts per revolution. This produces a very high degree of accuracy and control of the rotation of gear 66 and thus of the displacement of fingers 24 and 26 about their respective pivots 42 and 46, FIG. 1.

In FIG. 1, wire feed assembly 23 includes a servo motor 72′ secured to housing 43 and an optical encoder 78′ coupled to motor 72′. The motor 72′ is driven by electrical signals on wires 76′ coupled to a power source (not shown) via control system 11. The encoder 78' respectively transmits and receives signals to and from control system 11 on cable 80'. The motor 72' and encoder 78' may be identical to the motor 72 and 78 of the finger drive mechanism of FIG. 2.

In FIG. 3, wire 25 feed wheel 132 is driven by motor 72'. An idle wheel 134 is attached to rocker arm 136. Arm 136 is pivoted to housing 43 at pin 138 and is resiliently urged in direction 140 by spring adjustment mechanism 142 secured to housing 43. Mechanism 142 resiliently squeezes wire 25 between the wheels 132 and 134. Mechanism 142 adjusts the force of wheel 134 on wheel 132 to provide a friction drive force on wire 25 which passes between the wheels.

Tube 33 extends beyond bracket 37 to a region adjacent the interface between wheels 134 and 132 where the tube is aligned with tube 35. As wire 25 is fed through tubes 33 and 35 it is exposed in the region between the tubes for action by the feed wheels. Feed mechanism 23, FIGS. 1 and 3, initially feeds wire portion 84 into alignment with projections 82 of finger 26. Tube 35 being attached to finger 26 insures that the portion 84 extending from the tube is aligned with the finger projections.

Figure 7:
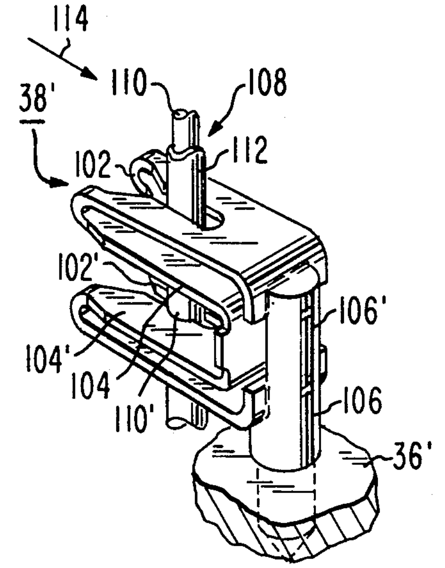
FIG. 7 is an isometric view of an insulation displacement terminal of the type which can be employed with the tool of FIG. 1.
Figure 6:
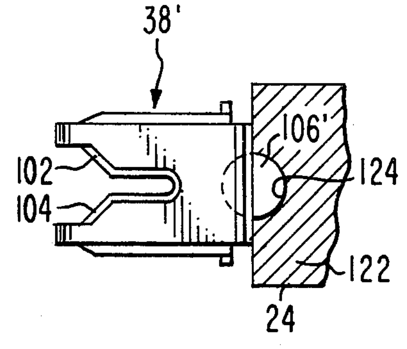
FIG. 6 is a plan view of an insulation displacement terminal in engagement with the terminal supporting finger of the tool of FIG. 1.

In FIG. 7, a typical IDT 38' includes a pair of inner tines 102 and 104 parallel to a second pair of inner tines 102' and 104'. Also included are two outer tine pairs which grasp the wire insulation. The tines extend from an upright post 106 which is secured to substrate 36' which may be a printed circuit board. The wire, including portion 108 attached to IDT 38' by the tool 10, FIG. 1, includes a metal core 110 and an insulating jacket 112. The wire portion 108 is pushed in direction 114 into electrical contact with the tines 102, 104, 102', and 104', the wire being oriented perpendicular to substrate 36. This pushing action creates an insertion force of about 20 pounds for 24 AWG wire in one implementation due to the resistance of the wire insulation and core in making the interference connection with the terminal. The 20-pound force in direction 114 tends to bend the post of the terminal 38'. To preclude such bending, the terminal is supported by finger 24, FIG. 6, during the insertion (only one finger being shown in FIG. 6).

During manufacturing, a terminal such as IDT 38' may be attached to the substrate 36 within a given tolerance range and may not always be attached or remain exactly perpendicular to the substrate 36, but may be slightly skewed. It is important when attaching a wire to an IDT with a robotically operated system that the fingers 24 and 26 be accurately positioned relative to the terminal tines to insure the wire portion is inserted in its proper location. The terminal should be squeezed in the desired direction by the mating fingers 24 and 26. That squeezing action would tend to crush or otherwise deform a misaligned terminal in an undesirable way. For this reason, a typical terminal such as terminal 38', FIG. 7, includes a tine support rib 106' aligned with and secured to the tines. Rib 106' aids the location of finger 24, FIG. 5, via slot 128 of yoke 126 at the lower end of the finger and provides support for reaction forces which oppose those forces induced by the insertion of the wire. Those reaction forces are borne by finger 24 such that negligible reaction forces are created in the robot or on the substrate due to the insertion. Rib 106', FIG. 7, is shown as an extension of post 106. In the alternative, the rib may comprise any structure suitable to support the tines and provide a region for aligning the terminal relative to the supporting finger such as finger 24, FIG. 6.

Figure 4:
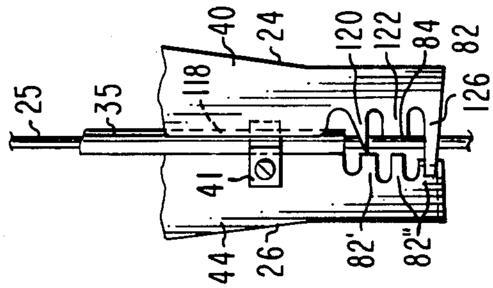
FIG. 4 is a fragmented front elevational view of the insertion fingers of the tool of FIG. 1 showing the fingers in more detail.
Figure 5:
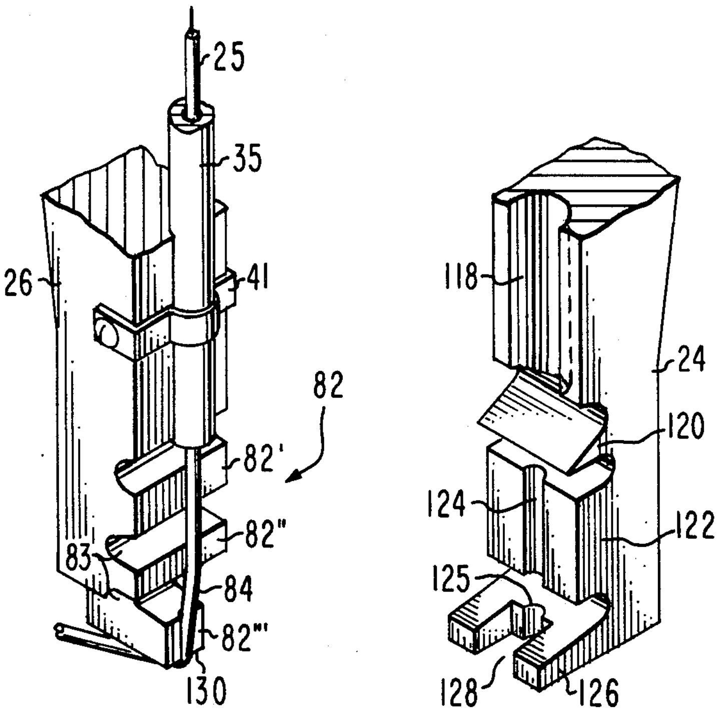
FIG. 5 is an isometric view of the fingers of the tool of FIG. 1 illustrating their wire processing portions.

In FIG. 5, finger 24 has an elongated groove 118 which receives the wire feed tube 35, when the fingers 24 and 26 are in the closed wire sever state, FIG. 4. Finger 24 includes a blade 120 which mates with finger 26 projection 82', FIG. 5, in the closed wire sever state. The blade severs the wire projecting beyond tube 35 adjacent finger 26 projection 82'.

Finger 24 includes a terminal support 122 adjacent to blade 120. Support 122 includes an alignment groove 124 which closely receives terminal rib 106', FIG. 6. Groove 124 receives and seats rib 106' in the desired alignment prior to closing finger 26 which then pushes the wire onto the terminal. This terminal alignment is important because the misaligned fingers would otherwise crush the terminal. Thus, if the terminal is somewhat skewed or misaligned from its anticipated orientation or position a small amount relative to the fingers, the groove 124 tends to seat the terminal therein and displaces the terminal into the desired alignment. Yoke 126 includes a groove 125 in slot 128 which embraces the lower portion of rib 106, FIG. 7. The stiffness of rib 106, being supported by adjacent substrate 36', produces reaction forces on groove 125 of yoke 126 and groove 124 of finger 24, FIG. 5. These grooves align finger 24 to the terminal. The connection of finger 24 through support 12 to finger 26 is such that wire 25, FIG. 5, is accurately driven between tines 38' of terminal 38, FIG. 1. This alignment may involve small motions of mutual accommodation (shift of position) by terminal 38, support 12 and the supporting robot (not shown). It is well known that small compliant accommodations of alignment errors are necessary in robotic assembly operations. In many cases, the compliance is provided by the robot structure because the joint position servos do not provide complete rigidity when the robot arm is stationary.

Finger 26, FIG. 5, includes a set of wire insertion projections 82 for pushing the aligned wire 25 portion 82 onto the tines of terminal 38', FIG. 7. Projections 82 include projections 82', 82'', and 82''' separated by notches 83. Projection 82'' slips between the tine pair 102, 104 and 102', 104' during insertion. The other projections 82' and 82''' also push on the wire in cooperation with projection 82''. At the lowermost end of finger 26, projection 82''' includes a groove 130 for retaining wire aligned with projections 82 during the travel mode of the tool, as will now be explained. The groove 130 wraps around projection 82''' with a portion facing groove 125 of yoke 126, FIG. 5, and a portion extending along the lowermost end surface of finger 26. Projection 82''' has a width sufficiently narrow to fit within the slot 128 of yoke 126. When the fingers 24 and 26 are in the travel state, FIGS. 9 and 10, projection 82''' is placed within the slot 128 for embracing a wire passing therethrough from tube 35. The notches 83, FIG. 5, between projections 82', 82'', and 82''' receive the tines of the terminal.

Figure 10:
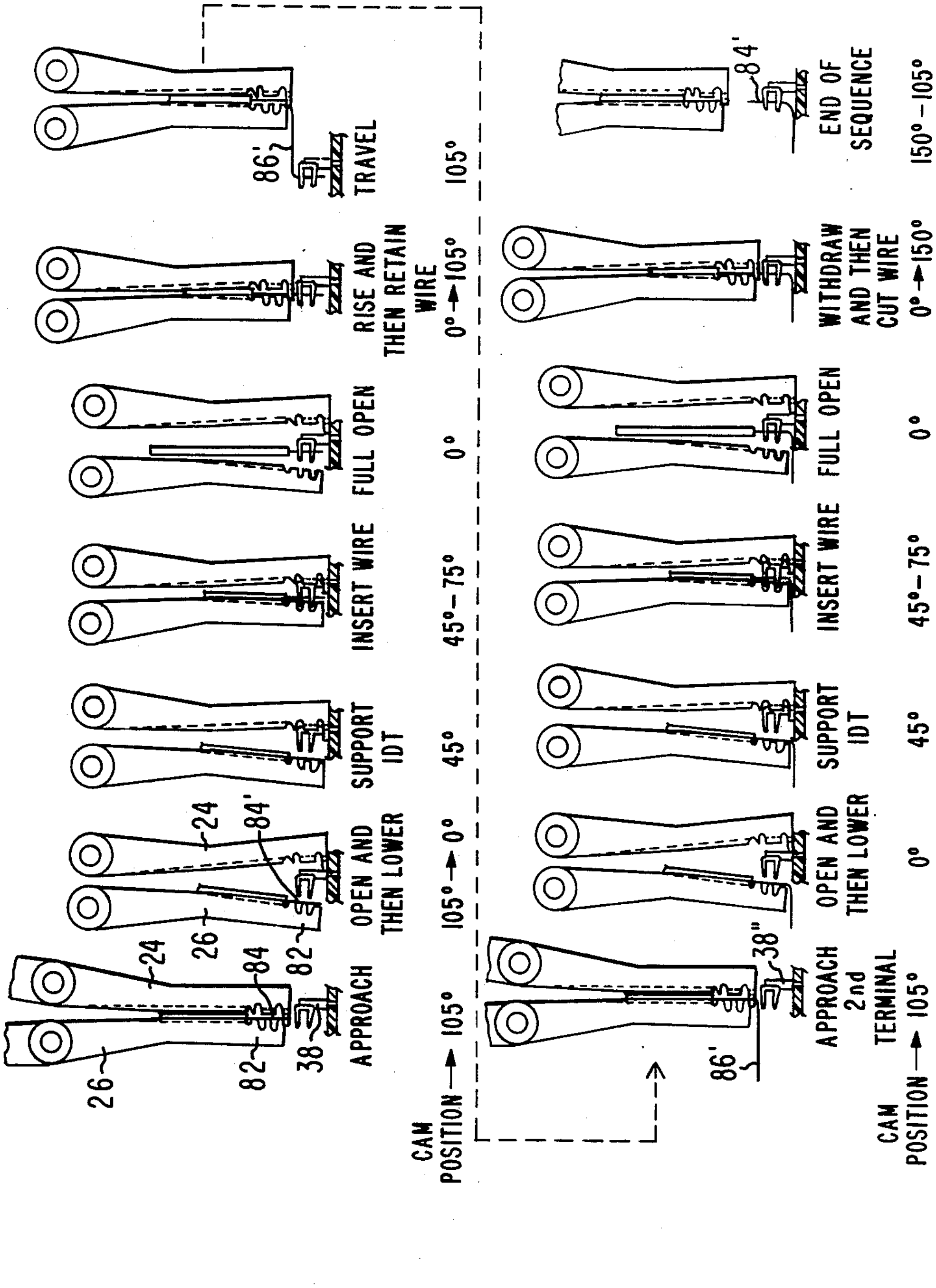
FIG. 10 is a sequential diagram illustrating the different positions of the fingers of the tool of the embodiment of FIG. 1 in different portions of a wiring cycle for attaching a wire to two IDTs on a substrate.

The operation of the tool is best illustrated by FIG. 10 which shows a sequence employed in attaching one end of a wire to a terminal and then attaching the other end of the wire to a second terminal and severing the wire from the tool. System 11, FIG. 1, moves arm 20 to raise and lower the fingers and move the fingers from terminal to terminal. The positions of the fingers relative to each other and to the terminal and the cam position at a particular portion of the wiring cycle is shown in FIG. 10. In the top left portion of the drawing FIG. 10, the wiring cycle begins with the approach of the fingers toward the terminal, as shown, with the cam in the 105° position. The fingers are then opened by rotating the cam from the 105° position to the 0° position, FIG. 9, curves a and b. The fingers are then lowered wide open until they are adjacent the terminal with the finger 24 adjacent the post of the terminal and the projections 82, finger 26, in position to insert the wire portion 84 onto the terminal 38 tines.

After the fingers are lowered, the cam is rotated to the 45° position, direction 64, FIG. 9, at which finger 24 seats the terminal and aligns the terminal. This moves the finger 26 to the start of the insert wire state and the finger 24 is gradually moved to the support terminal state, FIG. 9. In the former state, projection 82 begins pushing the wire just prior to its contact with the terminal and, in the latter state, support structure 122 slowly engages and mutually aligns the terminal and fingers 24 and 26 via rib 106', FIG. 6. This gradual alignment of the terminal and tool is important, as too quick an action may not allow the masses of the tool and robot to move in a compliant response to misalignment and may destroy the terminal. Such a gradual rate can be determined empirically for a given implementation. As the cam rotates through a 30° angle from the 45° position to the 75° position, FIG. 9, finger 24 remains in contact with the terminal, FIG. 6, supporting the terminal. Groove 124 keeps the rib portion 106' and the terminal tines aligned with the fingers 24 and 26, and finger 26 fully pushes the wire onto the terminal. The cam region between 45° and 75° is a dwell for finger 24 while finger 26 is continually pushed at a gradual rate toward finger 24. The gradual motion of finger 26 is produced by a gradual slope of the cam surface in cam 48, FIG. 8. This gradual slope provides a mechanical advantage in addition to that provided by gears 66 and 68, FIG. 2, which allow a relatively small motor to provide the force necessary to insert wire 25 into terminal 38. This inserts the wire portion 108 onto the terminal 38' tines, FIG. 7, into electrical engagement therewith. Finger 24, because of its abutment with the terminal provides rigid support during the wire insertion. The cam is then rotated to the 0° position to fully open the fingers, FIG. 10.

The fingers are then raised until they clear the terminal and the cam then rotates to the 105° position to the wire retain state. Rotation of cam 48 to the 105° position causes the finger 24 yoke 126, FIG. 5, to be placed adjacent finger 26 projection 82''' an amount sufficient to encircle and embrace wire portion passing through yoke 126 slot 128 and in groove 130 of projection 82'''. The 105° position is the wire retain state because the tool 10 can travel from terminal to terminal retaining the wire portion 84, FIG. 5, aligned with the projections 82 while one end of the wire is attached to a terminal. With the cam in the 105° position the tool is displaced to the next terminal 38'. As the tool is displaced system 11 causes wire feed assembly 23, FIGS. 1 and 3 to feed wire to the fingers at about the same rate as the tool is displaced to minimize tension on the wire 86' attached to terminal 38. The wire during this time also slides in groove 130, FIG. 5, of projection 82''' as the wire is fed from the fingers.

The position of the cam 48 is known by the controller via the feedback signal from the encoder 78 and the amount of wire fed through tube 35 is measured and controlled by encoder 78', FIG. 1, and controller system 11. The amount that drive wheel 132, FIG. 3, is rotated provides a measure of the amount of wire fed. The feeding of the wire is positive in the sense that the wire is fed to the fingers to meet the requirements of the tool as the tool travels from terminal to terminal. That is, the controller system 11, FIG. 1, is the type that can be taught the amount of wire the tool needs in order for the tool to lay a piece of wire in a given path. As the tool 10 travels that path, system 11 causes feed assembly 23 to feed the needed amount of wire to avoid placing too much tension in the wire. If the wire feed rate is too slow, the wire, with one end attached to a terminal, passing through tube 35 would be pulled about projection 82''', FIG. 5. This would tend to cause a relatively sharp bend in the wire which bend tends to curl the wire, which is indesirable. The bend also can create a relatively high amount of resistance in large wires, e.g., 24 AWG, during pulling of the wire from tube 35. The curl is undesirable because it tends to misplace the wire path between terminals in undesirable positions—curls the wire from a straight point-to-point path. The high friction force in resisting pulling the wire from the tube tends to create high tension in the wire and may bend the terminal to which the wire is attached as the tool travels. Therefore, system 11 and feed assembly 23 feed wire to finger 26 at the predetermined correct rate so that the wire issues with low tension and curl.

The servo-driven wire feed motor 72', FIG. 1, can dispense wire as fast as the robot arm 20 moves. The problem is to dispense enough wire from spool 27 to keep the wire beyond the fingers slack without losing control of that wire. This problem is complicated by the fact that the robot motion will not be uniform; acceleration and deceleration dominates the short moves in most wiring applications. However, since the robot path will consist of easily measured straight line segments, the tool control system 11 can be taught such measurements. For each move in a given direction, the distance and elapsed time can be measured by moving the robot arm over the selected path. Assuming that the move time will be equally distributed between both acceleration and deceleration in a given direction, a displacement-time profile can be calculated from which the length and average speed of wire feed can be estimated for each straight line segment. This profile is then programmed into control system 11.

The fingers, FIG. 10, then approach the second terminal 38" and when aligned with it are opened by rotating the cam to the 0° position and then lowered adjacent to terminal 38", as shown. The terminal 38' is supported by finger 24 after the cam moves into the 45° position and the wire is then inserted as the cam is further rotated from the 45° position to the 75° position. The cam returns to the 0° position opening the fingers which are then lifted until they clear the terminal. The cam is then rotated in one motion to the 150° position causing blade 120, FIG. 4, to sever the wire portion 84' from the remaining wire in tube 35. The severing takes place immediately above the terminal so that portion 84' may remain slightly above the terminal as shown in FIG. 10. The fingers are then moved to a third terminal (not shown) and the wiring cycle repeated for the next sequence of terminals or the wiring operation is stopped. Thus, the tool travels from terminal to terminal, which may be in a complex path.

It is not necessary to cut the wire after it has been inserted in the second terminal. Instead, the robot may carry the tool to a third terminal, where the wire is again inserted. The operation may continue indefinitely, connecting any number of terminals in daisy-chain fashion.

With small diameter wire, e.g., less than 24 AWG, the forces to pull the wire through tube 35, FIG. 1, are sufficiently low that the tension on the wire will not tend to bend over a terminal to which the wire is attached. The curl can be tolerated as the tension in the wire can keep the wire taut between two terminals. Such a wire attached to a terminal has sufficient connection strength to the terminal that, displacement of the tool relative to the terminal is sufficient to pull the wire from the spool 27, FIG. 1, through the now-passive wire feed assembly 23 without significant tension in the wire. In this case, in the alternative, the feed assembly 23 may remain passive without position drive of motor 72' by system 11. The feed motor 72' and encoder 78' are of low inertia and freely starts to rotate when not energized and therefore do not contribute significantly to the pulling tension after the wire has been attached to an IDT but not yet severed from the tool.

In the embodiment illustrated, the fingers are pivotally secured to the support. In the alternative, the fingers may comprise elements movably secured to the support in other ways, e.g., secured for reciprocating rather than rotation. The important factor is that insertion reaction forces are relieved from the robot arm and from the substrate while the fingers are operated in multiple states and rates at relatively high power by relatively small electric motors.

What is claimed is:

1. A wire insertion tool for inserting a wire into electrical engagement with an insulation displacement terminal (IDT) on a substrate, said terminal including a set of spaced tines extending in a given direction for receiving at one end thereof said inserted wire and further including tine support structure at the other end thereof for securing said tines to a post extending approximately normal to said direction, said tool comprising:

a support adapted to be attached to an automatic insertion tool head which locates and moves the tool relative to said IDT;

a first element movably secured to the support having an open state and a terminal support state, said element having a groove therein adapted for receiving and mating with said tine support structure in said support state, said groove and support structure being dimensioned such that said receiving tends to align said tines relative to said groove;

a second element movably secured to the support having an open state, a closed state and a wire insertion state between its open and closed states, said second element including a wire insertion member adapted to mate with said tines in said insertion state for pushing said wire into said electrical engagement with said aligned tines;

wire feed means secured to the support for feeding said wire between and aligned with said groove and said insertion member; and actuating means coupled to the support and the first and second elements for initially causing said first element to move from its open state to its support state to seat and align said tine support structure in said groove and thereby align said tines relative to said second element, and then for causing said second element to enter said insertion state to push said wire toward the first element and into said engagement with said tines while said first element supports said tines at said tine support structure with negligible reaction forces on said tool head and on said substrate.

2. The tool of claim 1 wherein said actuating means includes means for maintaining said first element in the support state and for moving the second element into said insertion state during said maintaining.

3. The tool of claim 1 wherein said means for moving said first element includes means adapted to move the first element at a relatively gradual rate over a given time interval prior to the commencement of said second element insertion state.

4. The tool of claim 1 wherein one of said first and second elements includes a blade projecting therefrom facing the other element, said other element including a cutting anvil facing and adapted to mate with said blade, said feed means feeding said wire between said blade and anvil, said actuating means including means for selectively causing at least one of said elements to move toward the other of said elements an amount sufficient to sever said wire passing between said blade and anvil in a sever state.

5. The tool of claim 1 wherein said elements are pivotally secured to the support, the elements including channel means for embracing said fed wire in a wire retaining state to retain said fed wire in alignment with said elements after the attachment of said wire portion to said terminal.

6. The tool of claim 5 wherein said actuating means includes means for placing at least one of the elements in respective different positions in said open, support, wire retaining, and sever states.

7. The tool of claim 5 wherein said channel means includes a channel member extending from the first element an amount sufficient to be spaced sufficiently close to the second element to form an enclosed aperture therewith in said wire retaining state.

8. The tool of claim 1 wherein said elements comprise first and second fingers pivotally secured to the support, the actuating means including a cam rotatably coupled to said fingers for placing said fingers into said states in accordance with the relative rotatable position of the cam to the fingers and further including drive means for selectively rotating said cam.

9. The tool of claim 1 further including wire severing means coupled to the support for selectively severing said wire portion from said wire feed means.

10. The tool of claim 9 wherein said wire severing means includes a blade rigidly attached to the first element and operated by the displacement of said first element through the terminal support and wire retaining states to the wire sever state adjacent the second element.

11. The tool of claim 9 wherein said actuating means includes cam means for sequentially placing the fingers from said open state through the terminal support-wire insertion state and to the wire retaining state.

12. The tool of claim 1 wherein said support includes means adapted to mate with and be attached to a robotic arm.

13. The tool of claim 1 further including control means coupled to the support for moving the tool from a first location to a second location at a given rate, said feed means including means for feeding said wire to said fingers at said given rate.

14. The tool of claim 1 further including control means for moving the tool from a first location to a second location for attaching a wire to a first terminal at the first location and to a second terminal at the second location, said wire being pulled from said tool as said tool travels and tending to have tension of a relatively undesirable value due to said pulling, said feed means including means for feeding said wire to said tool at a rate to maintain the tension in said wire below said value.

15. In a wire insertion apparatus including a tool for automatically attaching a portion of a wire to an insulation displacement terminal (IDT) of the type including a pair of insulation displacement tines extending approximately normal to a post attached to a substrate, said apparatus including tool locating and displacement means for automatically locating the wire insertion tool at a given wire insertion location on the substrate for inserting a wire onto said IDT and for moving the tool from terminal to terminal on the substrate, said tool comprising:

a support including means for releasably attaching the support to said locating and displacement means;

first and second aligned facing fingers pivotally secured to the support at spaced corresponding pivots;

the first finger including terminal support means, said first finger having an open state and a terminal support state, said terminal support means being adapted to abut said terminal to align and support said tines in response to a pushing force normal to said post by the second finger;

the second finger having an open state and a wire insertion state, said second finger including wire pushing means adapted to abut said wire portion and push said portion against and into engagement with said tines toward said terminal support means in the wire insertion state;

at least one of said fingers including a channel member dimensioned to permit said wire to pass therethrough and shaped to selectively form an enclosed aperture with the other of said fingers in a wire retaining state to retain said passed-through wire in alignment with said terminal support means and pushing means as said tool is moved from terminal to terminal;

wire severing means coupled to said fingers spaced between the terminal support means and the pushing means and the respective pivots of the fingers for severing said wire portion from said wire in a sever state;

wire feed means secured to the support for selectively feeding said wire portion between said fingers including said terminal support, pushing means and severing means, and the channel of said channel member; and actuating means coupled to said support for causing said fingers to be selectively cooperatively placed in one of said open, terminal support-wire insertion, retaining, and severing states.

16. The tool of claim 15 wherein said fingers are so constructed that they pass from the open state to the terminal support-insertion state to the retaining state and thence to the severing state as the fingers pivot closed from the open state.

17. A method for attaching a wire to an insulation displacement terminal (IDT) having a set of tines open at one end to receive a wire to be attached thereto, a support structure at the other end of said set, and a post for attaching said tines substantially parallel to a substrate so the inserted wire is normal to the substrate, said method comprising:

(a) supporting said terminal at said support structure;

(b) pushing a first portion of said wire into engagement with said tines in a direction toward said supported support structure and parallel to the substrate;

(c) releasing the support structure and pushed portion;

(d) aligning a second wire portion of said wire with a second terminal;

(e) repeating the steps a–c; and then:

(f) severing the wire from the last-attached terminal.

18. The method of claim 17 comprising repeating the steps a–f automatically with a plurality of sets of terminals.

19. The method of claim 17 further including the steps of:

approaching the terminal with said first wire portion;

aligning said first wire portion with the terminals tines; and then continuing onto steps a–f.

20. A method for automatically attaching a wire to a plurality of IDT terminals whose tines are parallel to a substrate comprising:

(a) approaching one of the terminals with a wire to be inserted normal to the substrate;

(b) aligning a first portion of the wire to the one terminal;

(c) supporting the one terminal in a given direction;

(d) while supporting, pushing the wire onto the terminal parallel to said given direction and said substrate;

(e) releasing the wire portion and the terminal;

(f) moving a second portion of the wire to a separate, different terminal;

(g) repeating steps a–f for each separate terminal in the sequence; and then:

(h) severing the wire from the wire portion attached to the last terminal in the sequence.

* * * * *